DEFLECTION COIL ARRANGEMENT

Filed Feb. 26, 1949 2 Sheets-Sheet 1

INVENTOR
WILLIAM E. SCULL, JR.
BY [signature]
ATTORNEY

Sept. 25, 1951 W. E. SCULL, JR 2,569,343

DEFLECTION COIL ARRANGEMENT

Filed Feb. 26, 1949 2 Sheets-Sheet 2

INVENTOR
WILLIAM E. SCULL, JR.
BY
[signature]
ATTORNEY

Patented Sept. 25, 1951 2,569,343

UNITED STATES PATENT OFFICE 2,569,343

DEFLECTION COIL ARRANGEMENT

William E. Scull, Jr., Haddonfield, N. J., assignor to Radio Corporation of America, a corporation of Delaware Application February 26, 1949, Serial No. 78,487

11 Claims. (Cl. 313—76)

The present invention relates to improvements in electromagnetic deflection devices for use in beam deflection systems, and more particularly to a novel distortion compensatory deflection yoke arrangement for use in television cathode ray beam deflection systems.

The present invention is concerned more directly with a simple arrangement for correcting cathode ray beam electromagnetic deflection yokes for distortion in produced scanning fields due to waveform distortion inherent in present day television systems.

The need for linearity in cathode ray beam deflection is perhaps in no greater evidence than in the television art. Here linear deflection circuits must be provided which sustain a manufacturing cost low enough to permit their use in the ever-increasing number of commercial television receivers and equipments for purchase and use by the general public. Although through the exercise of extreme care in design and rather elaborate circuit arrangement cathode ray deflection systems having high degree of linearity may be produced and are well known there still remains the need for an inexpensive, yet effective, system suitable for mass commercial utilization.

In low cost electromagnetic deflection systems, with which the present invention is more directly concerned, the attempt is generally made to supply the deflection yoke with a substantially linear sawtooth current waveform. However, the obtaining of a truly linear waveform is somewhat complicated by the inherent resistance of the deflection yoke winding which tends to produce a "squeeze" effect on one extremity of beam deflection. In electromagnetic reaction scanning arrangements employing a simple diode as a damper tube, distortion is again very common due to the non-linearity of the damper tube impedance characteristics with change in yoke voltage. This latter effect produces a "stretching" of one scanning extremity. In television applications, the linearity of over-all beam deflection is further discouraged by the inherent stretch of the scanning action at its extremities due to usual flatness of the scanned television target or the image reproducing screen.

For electromagnetic deflection systems producing viewed scansion from left to right, on, for example, the screen surface of a cathode ray image reproducing tube, these errors taken in combination are to a limited extent self-compensating. For example, on a left to right scansion, the resistance of the yoke will tend to produce a "squeeze" on the right side of the tube screen.

On the other hand, the flatness of the tube face will tend to produce a "stretch" on the right side. Thus, the squeeze due to yoke resistance and the stretch due to tube face flatness will tend to compensate. The stretching in scanning action due to the damping tube (in the case of a reaction scanning system) will however occur on the left side of the tube face and thus add to the stretch on the left side due to the flatness of tube face. This latter intensified stretch is in most instances compensated for only through rather elaborate means but through use of the present invention is quite simply and effectively corrected.

In order to compensate for the stretching effects on the extremities of scansion in electromagnetic deflection systems, the present invention provides for the use of a control winding in the electromagnetic deflection yoke structure, this winding being a shorted turn so positioned to attenuate the flux at the vicinity of the distorted scansion action extremity so as to produce in that vicinity a corrective or compensatory squeeze.

It is therefore an object of the present invention to provide a new and improved form of electromagnetic deflection yoke for cathode ray deflection systems which incorporates corrective features tending to compensate for distortions inherent in electromagnetic deflection systems.

It is further an object of the present invention to provide a simple and economical device for correcting flux patterns created by conventional electromagnetic beam deflection yokes to provide compensation for inherent distortion influences found in common forms of electromagnetic deflection systems.

Another object of the present invention resides in the provision of an adjustable compensatory device for correcting the distortion in the electromagnetic deflection systems due to undesirable characteristics in the waveform applied to the deflection yoke.

It is still further an object of the present invention to provide a compensating system for electromagnetic deflection yoke employed in a reaction scanning deflection system in which there is inherently developed a waveform causing stretch of the scansion action on one extremity of the scanning cycle.

The present invention has numerous other objects and features of advantage, some of which, together with the foregoing will be set forth in the following description of specific apparatus embodying and utilizing the invention's novel method. It is therefore to be understood that the present invention is not limited in any way to the apparatus shown in the specific embodiments as other advantageous applications in accord with the present invention, as set forth in the appended claims will occur to those skilled in the art after having benefited from the teachings of the following description especially when considered in connection with the accompanying drawings in which:

Figures 1, 2, 3, 4:
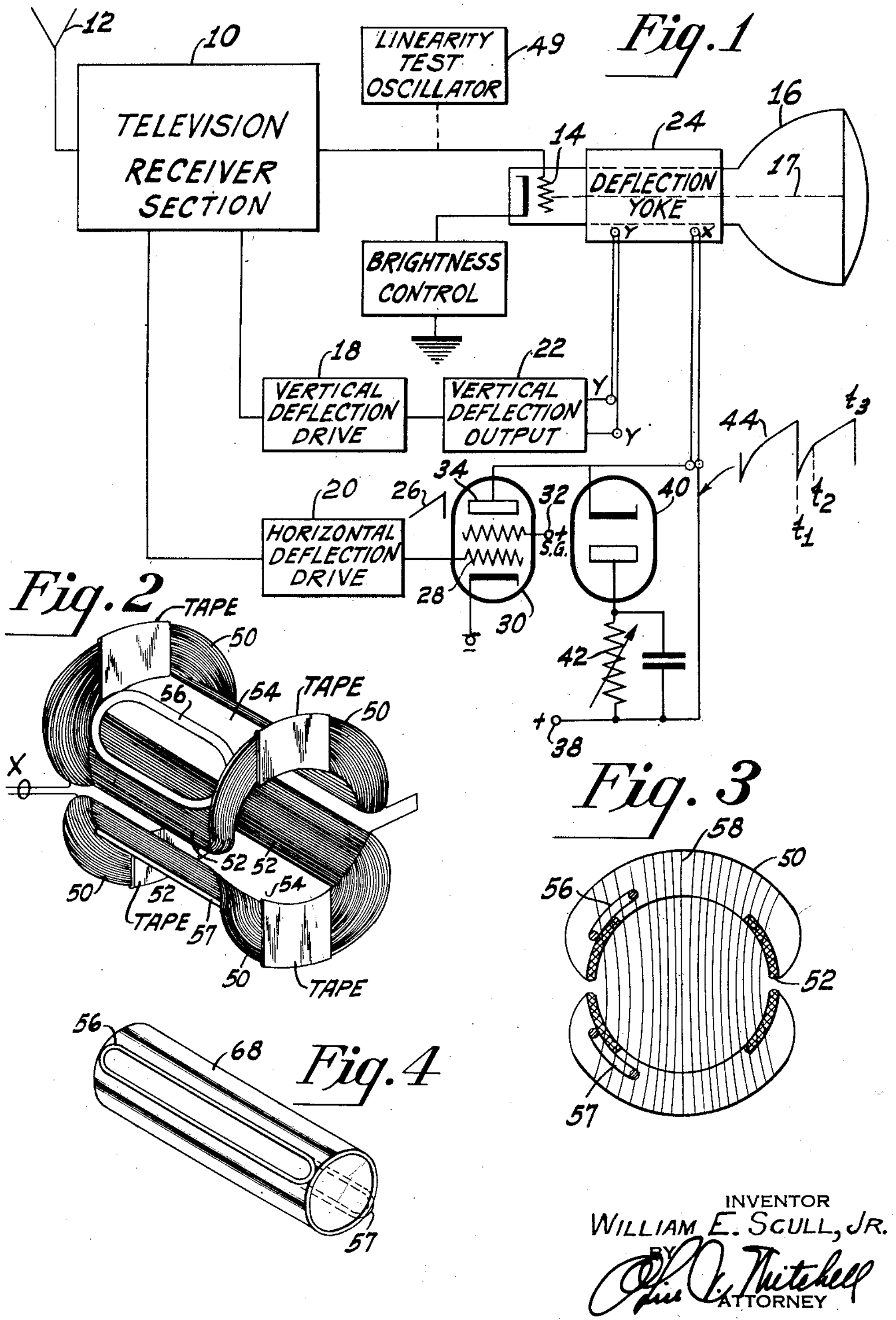
Figure 1 illustrates a typical television receiving system employing electromagnetic deflection in which the present invention finds particularly useful application.
Figure 2 illustrates a portion of the coil arrangement found in a typical deflection yoke structure and the corresponding application of the present invention thereto.
Figure 3 is a sectional view of the coil structure arrangement shown in Figure 2.
Figure 4 illustrates a sleeve compensating arrangement in accordance with the present invention adapted to slide within the coil structure of Figure 2.

Referring now to Figure 1, there is shown conventional television receiving system. Television receiver section 10 may comprise a suitable RF amplifier, converter, oscillator, IF amplifier, video demodulator, video amplifier, sync separators and sync amplifiers, typical circuit arrangements of which are given in an article entitled "Television Recivers" by Antony Wright, appearing in the March 1947 issue of the RCA Review.

Television signals are intercepted by the antenna 12; demodulated and amplified in the receiver section 10, and applied to the control grid 14 of the cathode ray reproducing device 16.

Vertical and horizontal synchronizing signals are also separated from the incoming television signal and supplied to the vertical and horizontal deflection drive circuits shown at 18 and 20 respectively. The output of the vertical deflection drive circuit 18 then supplies driving signal for the vertical deflection output circuit whose output is in turn connected by means of terminals Y—Y to the vertical deflection coil winding Y of the electromagnetic deflection yoke 24. The output of the horizontal deflection drive circuit 20 is shown as being applied to a direct drive electromagnetic system for the horizontal deflection coil winding X also included in the yoke 24. Accordingly, the sawtooth signal 26 appearing at the output of the deflection drive circuit 20 is applied to the grid 28 of the horizontal output tube 30. Suitable screen potential (+S. G.) for the output tube 30 is applied to terminal 32 thereof. The anode 34 of the output tube 30 is then connected with one terminal of the horizontal deflection winding X while the other terminal of the winding is connected with a positive power supply terminal 38. A reaction scanning arrangement is provided through the shunt connection of the diode 40 in series with a damping time constant circuit 42, across the horizontal deflection winding X.

As is well known to those skilled in the television art, the non-linear resistance characteristics of the damping diode 40, which is active to supply the first portion of the deflection current waveform, will produce a certain non-linearity in what is desired to be a linear sawtooth of current through the deflection winding. This is illustrated by the non-linearity between times $t1$—$t2$ of the waveform 44 representing the current flowing through the deflection winding. Here it can be seen that the first portion of the deflection cycle $t1$—$t2$ (corresponding to the left side of the picture, if conventional left to right scanning is employed) has a faster rise time or steeper slope than the second portion of the scanning cycle $t2$—$t3$, which latter portion may be considered as being supplied by the plate current of output tube 30.

Figures 5, 6, 7, 8:
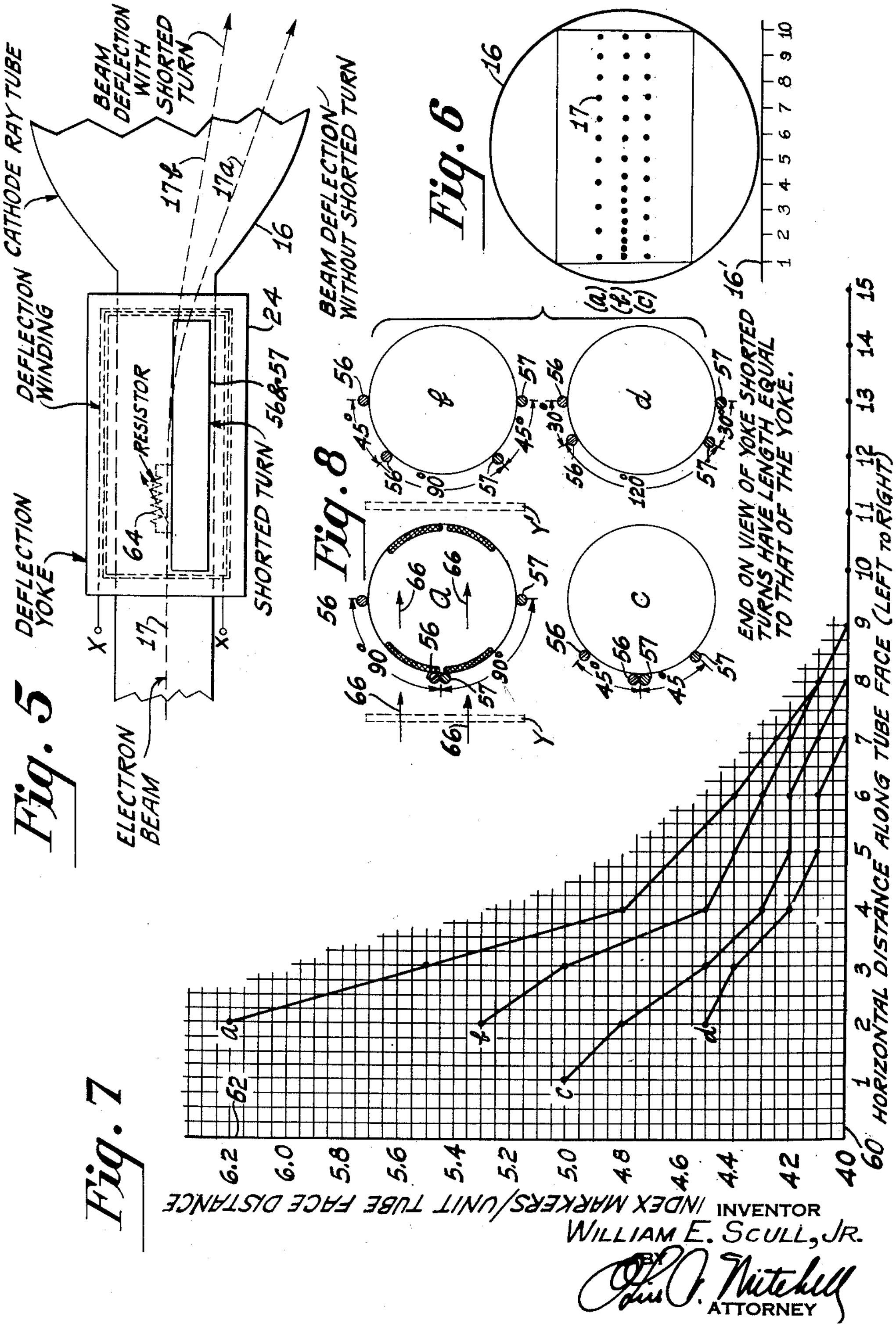
Figure 5 is a diagrammatic representation of the mode of operation of the present invention.
Figure 6 shows certain electromagnetic scansion linearity characteristics pertinent to the present invention.
Figure 7 is a graphic representation of certain characteristics of the present invention.
Figure 8 illustrates certain variations of the present invention whose respective characteristics are illustrated by the graph in Figure 7.

The effects of this stretching between intervals $t1$—$t2$ may best be illustrated with reference to Figure 6. Figure 6 illustrates a conventional and well-known method for testing the linearity of a deflection system. The electron beam such as 17 in the cathode ray reproducing tube 16 is deflected in the direction corresponding to the direction of scanning whose linearity is to be tested. The output of the linearity test oscillator, such as shown at 49 in Figure 1 is then applied to the control grid 14 to modulate the electron beam as it is swept across the face of the tube 16. In the case of the horizontal deflection system, which is now under consideration, the linearity test oscillator is usually productive of a sine wave (any waveform sufficing), which is held in a harmonic relationship with the horizontal deflection drive generator 20. There will then be produced on the screen of the cathode ray tube 16 a series of dots or index markers whose number is equal to the harmonic of the horizontal deflection drive generator at which the test oscillator is operated. In the case of the waveform 44, having the sharp rise $t1$—$t2$ during the first portion of the left to right scanning action, the test index dots 17 tend to be excessively separated at the left side of the picture and more evenly spaced toward the right of the picture. This effect is shown by scansion ($a$) of Figure 6. It may therefore be said that the non-linear characteristics of the diode 40 is productive of a "stretch" in the scansion on the left side of the picture corresponding to $t1$—$t2$ and is somewhat linear or normal during the portion $t2$—$t3$ corresponding to the right of the raster. A desirable linear distribution of the dots is shown in trace $c$ of Figure 6 in which the separation of the individual index dots across the face of the tube, as may be measured by scale 16′, is substantially equal.

According to the present invention, the nonlinear scanning action depicted in Figure 6($a$), resulting from the non-linearity of the deflection current waveform 44, is corrected by the application of a properly positioned shorted winding to the horizontal deflection winding of the deflection yoke 24. Figure 2 shows the upper and lower serially connected horizontal deflection winding sections of a deflection yoke such as 24. Each deflection winding section has upwardly flaring ends 50 and parallel edges 52 disposed to define the surface of a cylinder through which the neck of a cathode ray tube may be placed. The ends 50 and sides 52 of each section define a window opening 54 in each winding section, this window embracing the magnetic axis of the particular deflection winding section. Under normal operating conditions, the flux distribution through the window area 54 as well as through portions of the sides 52 is relatively uniform. However, according to the present invention, a first closed loop or shorted winding 56 is placed on the left side of the upper winding section coil and a second closed loop or shorted winding 57 is placed on the left side of the bottom winding section coil as shown in more detail by Figure 3. Figure 3 shows a cross-section of the deflection yoke in Figure 2 in a direction looking into the face of the cathode ray tube when the yoke is in place around its neck. Thus, the left and right sides of the yoke 50 in Figure 3 will correspond to the left and right extents of the test traces 16*a*, *b*, and *c* in Figure 6. The effect of the shorted turns 56 and 57, which will hereinafter be referred to as "control windings" or "control coils," will tend to reduce the flux density through that portion of the left section of the coil 50 embraced by what will be referred to as the "control window or opening" defined by the ends and sides of each of the control windings 56 and 57. The increased separation of the flux lines 58 through the control windings 56 and 57 are meant to illustrate a reduction in flux density in this section of the windings.

Accordingly, through the influences of the control windings 56 and 57, the electron beam will tend to be deflected less than normally as it enters into the zone influenced by these windings. This is illustrated in Figure 5, here the electron beam 17 is shown in a position 17*a* corresponding to a given deflection current in the horizontal winding *x* of the coil 24 without the application of the control winding or shorted turn 56. However, under the influence of the control winding 56, electron beam 17, for the same current through the deflection windings, is deflected only to the position 17*b*. It is seen, therefore, that the reduction in magnetic flux in the vicinity of the control windings 56 will tend to squeeze the left side of the beam scansion such as shown in the trace 16*b* of Figure 6.

The amount of squeeze on the left side of the trace 16*b* is, of course, controllable by varying the resistance of the control windings 56 and 57 or by altering their positions with respect to the windows on their respective coil winding sections. Furthermore, the sides of the control winding may be varied to embrace more or less of the flux pattern area and therefore exercise correspondingly more or less influence on the scanning of the area. As an instance of the latter two methods of control, Figures 7 and 8 are shown. The abscissa 60 of the graph in Figure 7 corresponds to linear measurements of distance from left to right along the face of the cathode ray tube 16 in Figure 6 in accordance with the scale such as 16′ shown in Figure 6. The corresponding ordinate 62, of the graph in Figure 7, sets forth values of index marker densities for various positions along the tube face. The four different curves, *a*, *b*, *c*, and *d* in Figure 7 correspond to the control winding positionings defined and shown by the conditions *a*, *b*, *c*, and *d* in Figure 8. Thus, the effect of the arrangement in Figure 8*a* appears to provide the greatest amount of "squeeze" on the left side of the tube face whereas the arrangement *d* seems to provide the least "squeezing" effect. More precisely, with the control windings embracing 90° of the cylindrical deflection yoke surface as in Figure 8*a*, the density of index markers changes from approximately 4.1 dots per unit length at position 8 on the right side of the tube face to 6.2 dots per unit length at position 2 on the left side of the tube face. For control winding position *d*, on the other hand, in which each of the control windings embraces only 30° of the yoke cylinder and are oriented as shown in Figure 8*d*, the marked dot density only varies from 4.0 at position 8 on the right of the tube face to 4.8 at position 2 on the left of the tube face. It can be seen therefore that by varying positioning and area of the control windows of the control winding 56 and 57, a considerable variation in "squeeze effect" can be obtained. Although not illustrated graphically, it is also possible to alter the resistances of the control windings to obtain varied squeeze distributions similar to curves *a*, *b*, *c*, and *d* in Figure 7 for the single 90° control winding arrangement at *a* in Figure 8. For this purpose, a dotted variable resistance element 64 is shown for optional inclusion in the control windings 56 and 57 of the illustration of Figure 5.

Therefore, by means of the present invention, the stretching of the picture illustrated in Figure 6(*a*) due to the non-linearity of waveform 44 between the intervals of $t1$—$t2$ may be compensated by a suitable squeezing or crowding effect produced by the control windings 56 and 57 as shown in Figure 6(*b*). By varying the amount of squeeze produced by the control windings as illustrated in Figures 7 and 8, the amount of squeeze in Figure 6(*b*) may be made of sufficient amount to compensate the stretch in 6(*a*) to produce the desirable linear scanning distribution of index markers as in Figure 6(*c*).

Although the present invention has been described in connection with two control windings, it is clear that a single control winding could be used in some instances if desired. However, referring to Figure 8, it will be appreciated that the practical application of the present invention to television deflection yokes must acknowledge the presence of the vertical deflection windings, which as is well known to those skilled in the art, are intimately associated with the horizontal deflection windings in a manner fully described, by way of example, by patent to L. Mauerer, Patent No. 2,269,678, issued January 13, 1942. The approximate orientation of these vertical coils relative to the yoke is represented in Figure 8(*a*) by the dotted areas Y and Y′ which depict a side view of the projected window areas of these vertical coils. The flux line pattern of vertical coils Y and Y′ would then be in a horizontal direction as indicated by arrows 66 in contradistinction to the vertically positioned flux lines due to the horizontal deflection coil windings as shown in Figure 3. Therefore, the control windings 56 and 57 will, in fact, have some influence over the vertical deflection linearity. In practice, the amount of influence is found to be very small compared to the effect displayed on the horizontal deflection action. However, it can be seen that the arrangement of the control windings shown in Figure 8(*a*) would provide the least distortive influence on the vertical flux pattern inasmuch as the whole vertical flux pattern is equally attenuated across the entire area by the control coils 56 and 57 which embrace the entirety of this vertical pattern. From the vertical deflection standpoint, Figures 8*b*, 8*c*, and 8*d* would be less favorable inasmuch as the vertical flux pattern would tend to be reduced in density in portions embraced by the horizontal control windings. In television practice, or the like, it may then be desirable to employ the arrangement of the control windings shown in Figure 8*a* and control their effect by adjusting the resistance in the respective control windings as hereinbefore noted.

A particularly convenient embodiment of the present invention is shown in Figure 4 wherein the control windings are associated with a sleeve which is free to rotate within the cylindrical envelope defined by the deflection yoke. Thus, in practice, the diameter of the cylindrical opening in the deflection yoke would be made slightly greater to accommodate a given sized neck on a cathode ray tube in order that the sleeve 68, with the control windings 56 and 57 integral therewith, may be inserted between the inside surface of the deflection yoke and the outside surface of the cathode ray tube neck. The application of the control windings 56 and 57 to the sleeve 68, of course, may be made in any desired manner, for instance, by means of present day printed circuit techniques. Moreover, the windings 56 and 57 may be each made on separate concentric sleeves, so that relative positioning between the control windings may be accomplished while the yoke is in operation. It is still within the scope of the present invention to employ a pair of concentric sleeves, such as 68, each having one side of the control windings included or printed thereon with slidable electrical connectors or brush action maintaining the ends of the control winding sides in contact. Such latter arrangement would then permit the actual area embraced by the control winding 56 to be adjusted while in position within the deflection yoke.

Although the present invention has been described in detail as being suitable for correction of particular distortion, characteristics produced by conventional beam deflection circuits and arrangements, it is manifestly suitable for producing desirable predetermined distortions or corrections of deflection winding patterns in equipment other than cathode ray reproducing systems.

What is claimed is:

1. An electron beam deflection yoke comprising a plurality of deflection coil conductors longitudinally disposed with reference to the axis of said yoke and substantially uniformly distributed so as to define boundaries of a utilization envelope in which a magnetic flux pattern produced by current flow through said deflection coil conductors is active to produce an electron beam deflection influence, and a closed loop winding disposed longitudinally with reference to the axis of said yoke and further positioned with reference to the boundaries of the utilization envelope to distort in a predetermined manner the magnetic flux pattern otherwise produced in said envelope by said current flow through said deflection coil conductors.

2. In an electron beam deflection system including a source of deflection current having inherent waveform deficiencies, a compensated deflection yoke comprising in combination, a plurality of deflection coil conductors arranged in winding form to define an open utilization area through which a magnetic deflection flux pattern may be produced by the influence of the deflection current flowing through said deflection coil conductors and a closed control winding so disposed relative to said coil conductors and said open utilization area to intercept and distort the magnetic flux pattern produced by said deflection current and thereby substantially compensate for the waveform deficiencies therein.

3. An electromagnetic deflection coil assembly comprising in combination: a pair of coils having magnetic axes substantially coincident with one another and each coil having sides and ends with a window defined by the portions of coil turns comprising the said sides and ends; the turns of said sides being relatively disposed to define a surface of a cylinder and extending longitudinally of the defined cylinder, said coils being further disposed relative to one another such that the projected window area of one coil is substantially coincident with projected window area of the other coil; a flux pattern control winding shorted upon itself, said control winding having sides and ends defining a control window area; and means for fixing said control winding with respect to one of said coils such that the control window area embraces a portion of the common projectable window area of the coil pair.

4. An electromagnetic deflection coil assembly comprising in combination: a pair of coils having magnetic axes substantially coincident with one another and each coil having sides and ends with a window defined by the portions of coil turns comprising the said sides and ends; the turns of the sides being relatively disposed to define a surface of a cylinder and extending longitudinally of the defined cylinder said coils being further disposed relative to one another such that the projected window area of one coil is substantially coincident with projected window area of the other coil; a magnetic flux attenuating device having an active flux attenuating area through which area magnetic flux is linearly attenuated; and means for fixing said flux attenuating device with respect to one of said coils such that the attenuating area embraces a portion of the common projectable window area of the common pair.

5. An electromagnetic deflection coil assembly comprising in combination: a pair of coils having magnetic axes substantially coincident with one another and each coil having sides and ends with a window defined by the portions of coil turns comprising the said sides and ends; the turns of the sides being relatively disposed to define a surface of a cylinder and extending longitudinally of the defined cylinder said coils being further disposed relative to one another such that the projected window area of one coil is substantially coincident with projected window area of the other coil; a pair of flux pattern control windings each shorted upon itself, each control winding having sides and ends defining a respective control window area; and means for fixing each of said control windings with respect to a respective one of said coil pairs such that each control window area embraces a portion of the common projectable window area of the coil pair.

6. Apparatus according to claim 5 wherein the two flux pattern control windings control window areas are disposed relative to one another such that the projected control window area of one window falls upon the projected control window area of the other winding.

7. Apparatus according to claim 5 wherein the two flux pattern control window areas are disposed relative to one another such that the projected control area of one is substantially coincident with the projected control window area of the other.

8. Apparatus according to claim 5 wherein said flux pattern control window area is such to substantially embrace 90° of the cylindrical surface defined by the side turns of the coil pair.

9. In an electron beam deflection system including a source of deflection current having inherent undesirable waveform peculiarities; an electromagnetic deflection yoke assembly comprising in combination a deflection coil divisible into two sections, each having sides and ends with windows defined by the portions of the coil turns comprising the sides and ends, the two coil sections having their magnetic axes substantially coincident with one another; the turns of each coil section being relatively disposed to define a surface of the cylinder and extending longitudinally of the defined cylinder, said coil section being disposed relative to one another such that the projected window area of one section is substantially coincident with the projected area of the other coil section; a flux pattern control winding shorted upon itself and having sides and ends defining a control window area; means for fixing the loop resistance of the shorted control winding; and means for positioning said control winding with respect to one of said coil sections such that the control window area embraces a portion of the common projectable window area of the coil pair, the amount of coil window area embraced and the resistance of said control winding being adjusted relative to one another to substantially correct the flux pattern passing through said coil section windows for undesirable characteristics due to the inherent undesirable waveform peculiarities of the deflection current.

10. Apparatus according to claim 9 wherein said control winding is incorporated in a cylindrical sleeve adapted to freely slide within the cylindrical surface defined by the turns of each coil section.

11. Apparatus according to claim 9 wherein said means for fixing the loop resistance of the shorted control winding comprises a lumped resistance unit of suitable resistance value connected serially in said shorted control winding.

WILLIAM E. SCULL, Jr.

REFERENCES CITED

The following references are of record in the file of this patent:

UNITED STATES PATENTS

| Number | Name | Date |
|---|---|---|
| 1,269,152 | Becker | June 11, 1918 |
| 1,390,319 | Warren | Sept. 13, 1921 |
| 2,004,099 | Bedford | June 11, 1935 |
| 2,155,514 | Tolson et al. | Apr. 25, 1939 |
| 2,172,733 | Federmann | Sept. 12, 1939 |
| 2,428,947 | Torsch | Oct. 14, 1947 |
| 2,461,230 | Obert | Feb. 8, 1949 |
| 2,487,688 | Bishofberger | Nov. 8, 1949 |
| 2,490,905 | Hardie | Dec. 13, 1949 |